US011950339B2

(12) United States Patent
Alfier et al.

(10) Patent No.: US 11,950,339 B2
(45) Date of Patent: Apr. 2, 2024

(54) LIGHTING APPARATUS, AND CORRESPONDING SYSTEM, METHOD AND COMPUTER PROGRAM PRODUCT

(71) Applicants: OSRAM GmbH, Munich (DE); CLAY PAKY S.p.A., Seriate (IT)

(72) Inventors: Alberto Alfier, Vedelago (IT); Andrea Laini, Bergamo (IT)

(73) Assignee: CLAY PAKY S.R.L., Seriate (IT)

( * ) Notice: Subject to any disclaimer, the term of this patent is extended or adjusted under 35 U.S.C. 154(b) by 0 days.

(21) Appl. No.: 17/836,006

(22) Filed: Jun. 9, 2022

(65) Prior Publication Data

US 2022/0346206 A1 Oct. 27, 2022

Related U.S. Application Data

(63) Continuation of application No. 17/078,132, filed on Oct. 23, 2020, now Pat. No. 11,382,201.

(30) Foreign Application Priority Data

Oct. 23, 2019 (IT) ........................ 102019000019664
Nov. 19, 2019 (IT) ........................ 102019000021627

(51) Int. Cl.
*H05B 47/105* (2020.01)
*F21V 14/02* (2006.01)
(Continued)

(52) U.S. Cl.
CPC ........... *H05B 47/105* (2020.01); *F21V 14/02* (2013.01); *H05B 47/17* (2020.01); *F21W 2131/406* (2013.01); *F21Y 2115/30* (2016.08)

(58) Field of Classification Search
CPC ....... H05B 47/17; H05B 47/105; F21V 14/02; F21W 2131/406
See application file for complete search history.

(56) References Cited

U.S. PATENT DOCUMENTS

| | | | | |
|---|---|---|---|---|
| 2014/0301078 A1* | 10/2014 | Gordin | .................... | F21V 21/30 362/269 |
| 2019/0376844 A1* | 12/2019 | Petricek | ................. | H04N 23/56 |
| 2020/0323065 A1* | 10/2020 | Hultermans | ........... | H05B 47/19 |

FOREIGN PATENT DOCUMENTS

DE 102016122309 A1 5/2018

OTHER PUBLICATIONS https://en.wikipedia.org/wiki/Intelligent_lighting#/Construction, page 5 of 8, accessed Dec. 1, 2022.

(Continued)

*Primary Examiner* — Alexander H Taningco
*Assistant Examiner* — Pedro C Fernandez
(74) *Attorney, Agent, or Firm* — VIERING, JENTSCHURA & PARTNER MBB

(57) ABSTRACT

A lighting apparatus includes a light-radiation generator configured to project a lighting beam towards a lighting space including at least one undesired lighting zone; a motorization of the light-radiation generator configured to move the lighting beam, the motorization of the light-radiation generator being controllable as a function of scanning-control signals received at the lighting apparatus; driving circuitry of the light-radiation generator configured to control emission of the lighting beam; processing circuitry configured to detect scanning-control signals received at the lighting apparatus and a scanning position of the lighting beam of the light-radiation generator, the processing circuitry being configured to control the lighting beam to be brought into said at least one undesired lighting zone; and memory circuitry configured to store therein at least one pair of boundary values of said at least one undesired lighting zone of said lighting space.

16 Claims, 6 Drawing Sheets

(51) Int. Cl.
*H05B 47/17* (2020.01)
*F21W 131/406* (2006.01)
*F21Y 115/30* (2016.01)

(56) References Cited

OTHER PUBLICATIONS

Communication pursuant to Rule 114(2) EPC received for the corresponding EP patent application 202002222.4, dated Nov. 29, 2022, 4 pages.
Gudrun Scharfe, PHAENON X Pro user's manual, Rev. 1. Published on Feb. 10, 2014, 102 pages.
Gudrun Scharfe, La Toolbox user's manual, Rev. 1. Published on Sep. 26, 2013, 50 pages.
Gudrun Scharfe, Description of PHAENON X laser projector on LaserAnimation Sollinger website, Published on Jul. 23, 2017, 6 pages.
"PHAENON X Pro" lighting apparatus (LaserAnimation model No. 070) as schematically depicted and specified, 14 pages.
Blizzard AT2 YC with LD, lighting apparatus (LaserAnimation model No. 049; predecessor to PHAENON X Pro) with custom "electronic masking" functionality, LaserAnimation delivery note 20120019, 1 page.
Method of using "PHAENON X Pro" lighting apparatus, Demonstration by Jürgen Kleine to users of YouTube video portal, https://www.youtube.com/watch?v=GT3UWpKbsBk&list=UUUK9_MSkWUX_rVuokh5Btow&index=58, Mar. 5, 2013.

* cited by examiner

LIGHTING APPARATUS, AND CORRESPONDING SYSTEM, METHOD AND COMPUTER PROGRAM PRODUCT

CROSS-REFERENCE TO RELATED APPLICATIONS

This Patent Application is a continuation of U.S. application Ser. No. 17/078,132, filed on Oct. 23, 2020, which claims priority from Italian Patent Application No. 102019000019664 filed on Oct. 23, 2019, and from Italian Patent Application No. 102019000021627 filed on Nov. 19, 2019; each of these applications are incorporated herein by reference for all purposes and in their entireties.

TECHNICAL FIELD

The present description relates to lighting apparatuses.

One or more embodiments may find use, for example, in the show-business or entertainment sector.

BACKGROUND

In sectors such as the show-business or entertainment sector (mentioned herein purely by way of reference) lighting systems are commonly used that comprise light-radiation generators (projectors), which can emit light radiation in conditions such as to possibly induce risks of a photobiological nature, in particular in the person who is looking at such a source of light radiation from a short distance.

These considerations apply in a way independent of the nature of the light-radiation generators, which may be either of a traditional type or LED or laser generators. This may be the case, for example, of the product commercially available from the present applicant Clay Paky under the brand names SCENIUS UNICO, Axcor 600, or XTYLOS.

The (minimum) safety distance of observation of such sources is defined as hazard distance (HD).

The value of HD can depend upon various parameters that are able to modify, for example, the radiance and the apparent dimensions of the source perceived by the observer.

In this regard, there has been developed over the years a standard regarding, for example, lamp or LED sources (IEC62471), which can be applied also in the case of laser sources provided that the Sub-clause 4.4 of the IEC 60825—third edition standard is satisfied.

In the case of lighting sources (luminaires) to which there is attributed a classification of risk above a contained risk, for example, values in the risk group RG3 (in the case of laser sources), the corresponding classification according to the IEC62471 standard may prove rather elaborate as a function of factors such as the wavelength, the size of the source, and the radiance at the distance HD calculated in the direction of propagation of the beam.

In applications such as those of the show-business or entertainment sector (which—it will once more be noted—are here considered by way of reference, without this implying any limitation of the range of possible application of the embodiments) the light beam is to be variously oriented in the three-dimensional space, for example, in for performing the functions commonly referred to as "pan" (slewing or scanning in the horizontal direction) and "tilt" (control of the position in the vertical direction or elevation). This corresponds in practice to creating around the light-radiation generator a three-dimensional spherical zone with a radius equal to the value HD, outside which observers should remain to avoid exposure to any possible risks.

According to the conventional terminology accepted also in the corresponding international safety standards, the aforesaid movement of steering of the light beam in three-dimensional space is commonly referred to as "scanning": see, for example, CFR—Code of Federal Adjustments Title 21 of the U.S. Food and Drug Administration (FDA), where "scanned laser radiation" is defined as "laser radiation having a time-varying direction, origin or pattern of propagation with respect to a stationary frame of reference".

In the case where it is envisaged that an observer (in particular, his eyes) may be located at a distance less than the value HD, it is possible to consider limiting the movement of steering of the beam (whether the movement of pan or the movement of tilt) and/or deactivating the light-radiation generator when the radiation could strike the observer. It is also possible to consider introducing further safety margins, for example applying a margin of 2.5 m beyond the value of HD.

To implement solutions of this kind it is possible to consider limiting in some way the possibility of steering of the beam, for example by:

- creating physical shields that prevent the beam from propagating in given directions;
- adopting proximity sensors; and/or
- controlling the direction of the beam via commands sent to the light-radiation generator (for example, via a DMX—Digital MultipleX—protocol, commonly used in the sector) starting from the console for managing the lights.

In addition to proving costly, the first solution comes up against the difficulty represented by the fact that the light-radiation generators are frequently mounted on trusses in the proximity of other generators for which it is desirable to avoid incurring in limitations as regards the possibility of movement of pan and tilt.

As regards the second solution, in addition to the fact that also this is quite costly, it proves sensitive to the possible presence of smoke or fog (frequently used in the show-business or entertainment sector) that are likely to alter operation of the sensors.

The third solution does not limit the degree of freedom of lighting designers and also allows exploitation of at least two advantageous features by now commonly present in many light systems:

- control of the movements of pan and tilt obtained via high-precision stepper motors (with capacity of control of steering with a resolution even of the order of a degree), with these motors that may comprise a position feedback-control function, which prove robust also in regard to adverse environmental conditions; and
- possibility of monitoring light emission in a precise way, for example with control functions (which are also possibly of a feedback-control type), for example via detection of current.

Such solutions make it possible to obtain, even within a single lighting apparatus (or fixture), a precise control both of the direction of the beam and of the intensity of the light radiation.

It should, however, be noted that solutions of this sort (basically as described in documents such as WO 2017/207276 A1 or WO 2018/154108 A1—which corresponds to AU 2018 223 167 A1—or, in a different context of application, U.S. Pat. No. 6,002,505 A) are exposed to possible risks linked to the commands applied to light-radiation generators starting from a control unit (console), for example, via a DMX protocol.

The above control signals can, in fact, be received in an altered way without the control unit being warned thereof; the control unit hence does not have the possibility of reacting so as to be able to prevent orientation of the light beam in undesired directions.

It has been noted that substantially similar aspects and considerations may regard the use of light-sensitive devices of various nature such as:

- image-capturing and recording apparatuses such as photographic cameras, video cameras, television cameras, smartphones, tablets (in brief, “camera apparatuses”); and
- detectors or sensors that are in some way sensitive to light, such as presence sensors operating with visible light or non-visible light (for example, infrared) or else sensors that can be used for measuring distances (for example, LIDAR systems) and can be equipped with moving heads.

It should moreover be considered that—in addition or as an alternative to the possible risk of a photobiological nature for the person looking at a source of light radiation—there enters into play the risk of the light-sensitive device being perturbed by the source of light radiation, for example with the corresponding risk of undesired saturation (blooming), at least at a local level, in the case of the image being produced by a camera apparatus.

OBJECT AND SUMMARY

The object of one or more embodiments is to overcome the drawbacks outlined previously.

According to one or more embodiments, this object can be achieved thanks to a lighting apparatus having the characteristics recalled in the ensuing claims.

One or more embodiments may regard a corresponding lighting system.

One or more embodiments may regard a corresponding method.

One or more embodiments may regard a corresponding computer program product, which can be loaded into the memory (either temporary or not) of at least one processing device and comprises portions of software code for executing the steps of the method when the product is run on at least one computer. As used herein, reference to such a computer program product is understood as being equivalent to reference to computer-readable means that contain instructions for controlling the processing system to co-ordinate implementation of the method. Reference to “at least one computer device” highlights the possibility of one or more embodiments being implemented in a modular and/or distributed form.

The claims form an integral part of the technical teachings provided herein in relation to the embodiments.

BRIEF DESCRIPTION OF THE DRAWINGS

One or more embodiments will now be described, purely by way of non-limiting example, with reference to the annexed drawings, wherein.

It will be appreciated that, for clarity and simplicity of illustration, the various figures may not be reproduced at the same scale, the same possibly applying also to different parts of one and the same figure. In the Figs., identical reference characters show identical features and functions.

DETAILED DESCRIPTION

Figure 1:
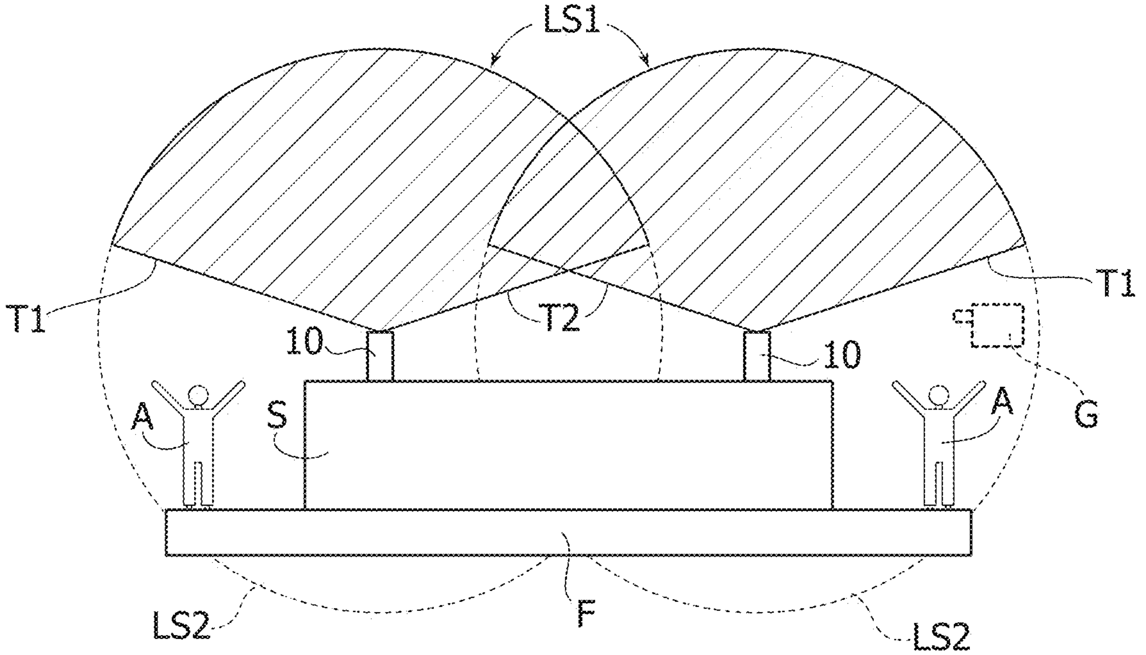
FIG. 1 exemplifies, with a view in side elevation, possible principles underlying the embodiments.

In the ensuing description, various specific details are illustrated to enable an in-depth understanding of various examples of embodiments according to the description. The embodiments may be obtained without one or more of the specific details, or with other methods, components, materials, etc. In other cases, known structures, materials or operations are not illustrated or described in detail so that the various aspects of the embodiments not will not be obscured.

Reference to “an embodiment” or “one embodiment” in the framework of the present description is intended to indicate that a particular configuration, structure, or characteristic described in relation to the embodiment is comprised in at least one embodiment. Hence, phrases such as “in an embodiment” or “in one embodiment” that may be present in various points of the description do not necessarily refer exactly to one and the same embodiment. Moreover, particular conformations, structures, or characteristics may be combined in any adequate way in one or more embodiments.

The references used herein are provided merely for convenience and hence do not define the sphere of protection or the scope of the embodiments.

One or more embodiments may envisage definition (also within individual lighting apparatuses comprised in a lighting system) of a range of pan values and a range of tilt values that are can define:

- one or more “desired”-lighting zones, where the functions of the apparatus or of the system are to be fully exploited; and
- one or more “undesired”-lighting zones, where the aim is to prevent any risks of a photobiological nature.

For instance, in one or more embodiments, it is possible to envisage (for example, on the part of the lighting designer) that the source of light radiation is activated (“on”) in the desired lighting zone or zones and deactivated (“off”) in the undesired lighting zone or zones.

There is thus created a mechanism of operation that is intrinsically safe and is not affected by possible unsatisfactory operation of a system for transmission of control signals to the individual lighting apparatuses, which operates, for example, via a DMX protocol.

With reference for simplicity—and without this implying any limitation—to the possible use in the show-business or entertainment sector, before a certain show the lighting designer can program a lighting system—even at the level of each individual lighting apparatus—defining a pair of lower limit and upper limit values both for the pan and for the tilt such as to delimit a range that can be defined (for example, by the lighting designer himself via a console) as “operative” or “desired” or else as “non-operative” or “undesired”.

In this regard, it is possible to envisage, for example, that:

- if the pan and tilt values received (for example, via a DMX protocol) correspond to a range defined as "operative" range, the apparatus is activated (on); or else, in a complementary way:
- if the pan or tilt values received (for example, via a DMX protocol) correspond to a range defined as "non-operative" range, the apparatus is deactivated (off).

After being programmed in this way, the individual lighting apparatus may (for example, at the level of a CPU that can be provided in the apparatus itself and by operating according to criteria in themselves known):

- verify the pan/tilt values received, for example via a DMX protocol or any in any other way (for example, starting from a console, via commands of some other nature, such as the so-called light cues, or starting from a local viewer, or in some other way);
- activate (switch on) or deactivate (switch off) the respective light-radiation generator according to whether the pan and/or tilt value received corresponds to a range whereby (according to the definition of operative or non-operative range given previously) activation of emission of the light beam is desired, and hence allowed, or else undesired, and hence not allowed.

Figure 2:
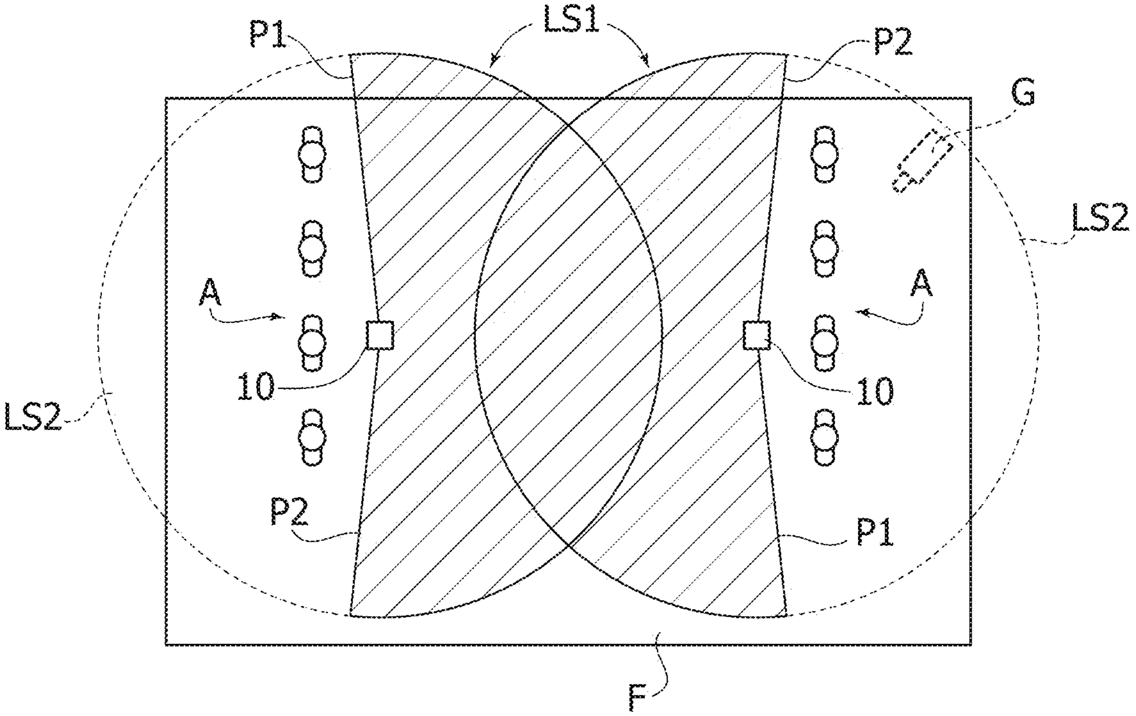
FIG. 2 exemplifies, in a top plan view corresponding to the view in side elevation of FIG. 1, possible principles underlying the embodiments.

For instance, FIGS. 1 and 2 refer (in side elevation and in a top plan view, respectively) to a situation in which a scene or stage S mounted on a ground or floor F where the audience A is present, is lit up via a lighting system assumed as comprising for simplicity (and in a non-limiting way) two lighting apparatuses 10.

These two apparatuses 10 can be assumed as having a respective value of hazard distance HD (assumed for simplicity as being the same for the two apparatuses), so that the apparatuses 10 are expected to have:

- an "operative" lighting range, i.e., a desired lighting range, designated by LS1, which—as regards tilt—is comprised between the values T1 and T2 pointing upwards (away from the audience A) and—as regards pan—is comprised between the values P1 and P2 pointing towards the centre of the scene or stage (also here, away from the audience A),
- a "non-operative" lighting range, i.e., an undesired lighting range, designated by LS2, which—as regards tilt—is once again comprised between the values T1 and T2 but pointing downwards (i.e., towards the audience A) and—as regards pan—is once again comprised between the values P1 and P2 but pointing away from the scene or stage (also here, towards the audience A).

One or more embodiments are suited, in a situation such as the one exemplified in FIGS. 1 and 2, to defining the desired lighting ranges or zones LS1 and undesired lighting ranges or zones LS2 in such a way that the area to be occupied by the audience A is "covered" by the undesired lighting zone LS2, where—as discussed in what follows—the action of lighting can be contained (for example, by deactivating the light-radiation generators, by dimming the intensity of emission thereof with an action of current modulation, by increasing the apparent size thereof, or else by preventing the light beam from being directed towards the zone LS2).

Figure 3:
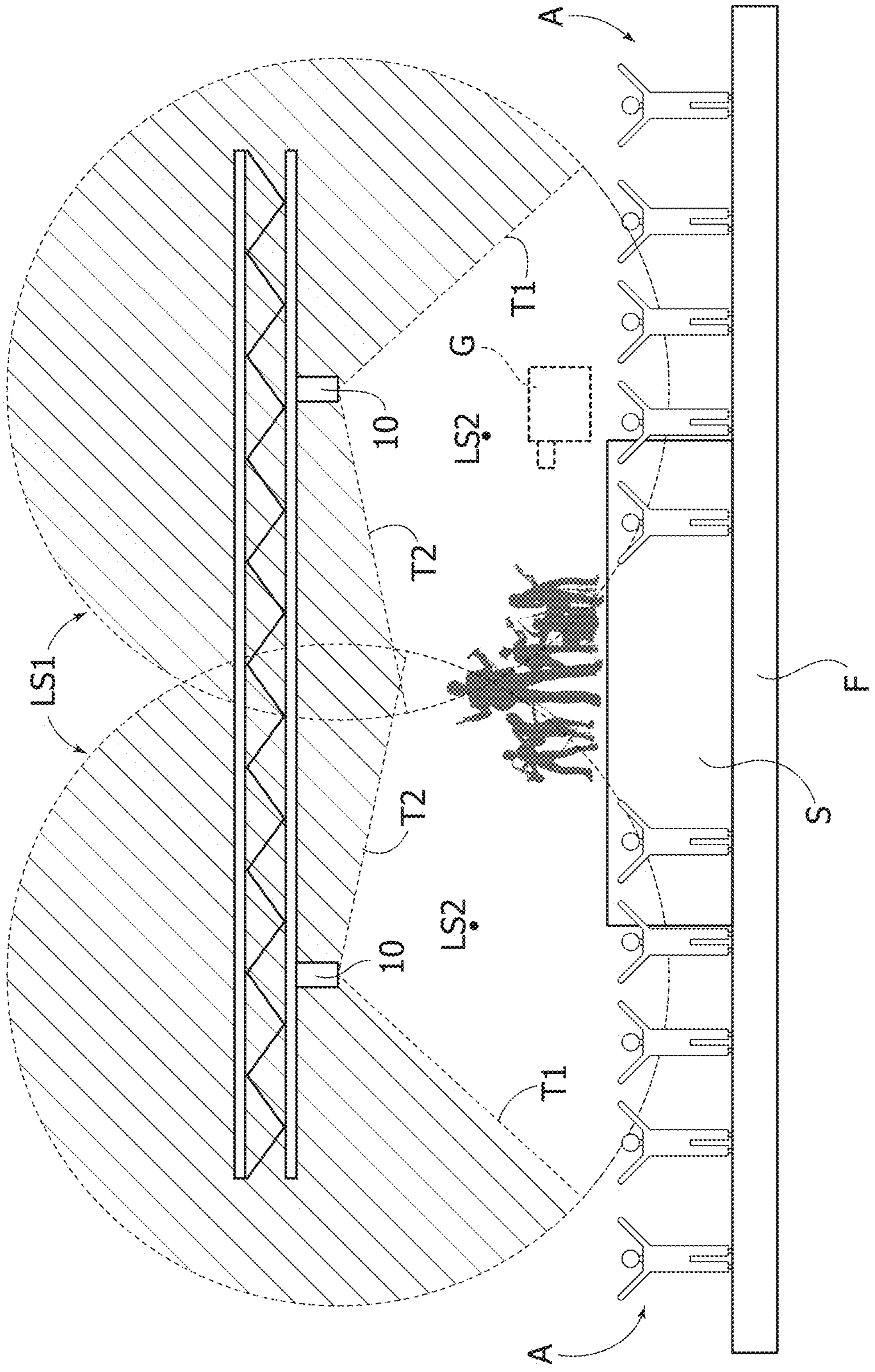
FIG. 3 presents, in a view in side elevation, possible principles underlying the embodiments.

FIG. 3 refers (once again by way of example and with reference for simplicity just to the case of tilt) to a system in which two apparatuses 10 with a value hazard distance HD (which also here is assumed for simplicity as being the same for the two apparatuses) are configured so as to have:

- an "operative" lighting range, i.e., a desired lighting range, designated by LS1, comprised between values T1 and T2 and once again pointing upwards (away from the audience A); and
- a "non-operative" lighting range, i.e., an undesired lighting range, designated by LS2, which is also comprised between values T1 and T2 but pointing downwards (i.e., towards the audience A).

In this case, the light beam of the apparatuses 10 may at least potentially be pointed either towards members of the audience A (such as the ones illustrated on the extreme left and on the extreme right in FIG. 3) who are at a distance greater than the hazard distance HD or towards members of the audience A (such as the ones illustrated in the central part of FIG. 3) who are at a distance less than the hazard distance HD.

One or more embodiments are suited, in a situation such as the one exemplified in FIG. 3, to defining the desired lighting range or zone LS1 (where the generators can be activated in their full emission potential) and the undesired lighting range or zone LS2 (where the light-radiation generators can be deactivated, or else their intensity of emission can be dimmed, for example, with an action of current modulation, or else their apparent size can be increased, or else their light beam being prevented from being directed towards the zone LS2) in such a way that the part of audience that is further away, at the sides in FIG. 3, will be comprised in the range or zone LS1 whereas part of the audience that is closer, at the centre in FIG. 3, is comprised in the range or zone LS2.

A solution like the one exemplified here is suited to integrating the corresponding function in a 3D simulator so as to simplify definition of the orientation parameters by the lighting designer. In this way, the lighting designer can define an expected "scenario" of use including the position of the lighting sources 10, the configuration of the sources (including the respective values of HD), and the position that the audience A is expected to occupy.

In this way, the simulator can calculate the pan and tilt values (P1 and P2, T1 and T2, as exemplified here), with the possibility of storing these parameters in the lighting system, in particular in the single apparatus 10.

As already discussed previously, the reference to the possibility of activating (switching on) or deactivating (switching off) the light-radiation generators of the apparatuses 10 according to whether they are oriented towards an allowed zone (desired lighting zone) LS1 or else towards a prohibited zone (undesired lighting zone) LS2 corresponds to one of various possible modes of implementation of safety solutions that aim at containing or limiting the intensity of the action of lighting so as to avoid risks of a photobiological nature.

For instance, in one or more embodiments, deactivation of one or more light-radiation generators may not be complete and may be carried out (for example, on the basis of a command imparted by the lighting designer) only in a partial way, for example, in the form of reduction or dimming of the intensity of the light radiation (obtained, for example, via an action of current modulation implemented according to criteria known to the person skilled in the sector), which in effect corresponds to reducing the value of the distance HD.

Once again, it is possible to envisage that a certain generator can be activated only for pan and tilt values comprised in a range corresponding to an allowed or desired lighting zone: for example, instead of being deactivated or subjected to dimming, a certain generator may be kept active (with full intensity) by configuring/programming the corresponding motorization of the beam in such a way that the motorization is inhibited from causing the beam to be projected towards a prohibited or undesired lighting zone (non-operative zone).

Once again, it is also possible to intervene on the light-radiation generators (in a way in itself known, for example, by intervening on a focusing optics) so as to modify the apparent size of the generator as this may be perceived by an observer, taking into account the fact that the photobiological risk (for example, at the level of thermal risk) can in effect be linked to the size of the light source as perceived by the observer.

It is here recalled that by "apparent size" (or by other terms currently used, such as angular diameter, angular dimension, apparent diameter, or viewing angle) is meant the extent—which can be expressed as angle—of the dimensions of an object observed from a certain observation point or else as the angle of rotation that allows the eye of an observer—or a camera—to pass from one end to the other of the object observed.

For instance, the apparent size of a circle lying in a plane perpendicular to the vector that goes from the observation point to the centre of the circle can be expressed in the form:

$$\delta=2\arctan(d/2D)$$

where:

d is the (real) diameter of the object; and

D is the distance between the observation point and the object.

In one or more embodiments, instead of operating on pan and tilt ranges defined simply by lower and upper limit values, such as P1, P2 or T1, T2 in FIGS. 1 to 3, one or more embodiments may envisage recourse to multiple ranges with the consequent possibility of defining desired- and undesired lighting zones having shapes with a boundary that is more complex than the ones exemplified in FIGS. 1 to 3.

In one or more embodiments, it is also possible to consider correlating the values of the pan and tilt ranges by monitoring the pan and tilt commands in a separate way. Likewise, even though for simplicity FIGS. 1 to 3 refer to apparatuses (in brief, sources) having values of pan and tilt ranges that are identical to one another, one or more embodiments may envisage the use of different values and/or the possibility of intervening also on parameters like the orientation parameter commonly defined as "yaw" or precession.

Once again, even though FIGS. 1 to 3 refer for simplicity to sources 10 having one and the same value of hazard distance HD, one or more embodiments may apply identically to light systems comprising sources 10 having HD values different from one another.

In one or more embodiments, in order to verify whether the pan and tilt values are located simultaneously in a range allowed for operation (operative or desired lighting range) it is possible to proceed in the following way:

- a matrix of values "0" or "1" is created, where, for example, the rows represent the pan values and the columns are the tilt values (or of course vice versa); and
- a processing function (for example, a CPU function), which can be included—as discussed in what follows—in an apparatus 10 as considered herein, can estimate absolute values of angles in space as a function of the pan and tilt values fixed by the lighting designer and verify, when these values are modified (this can be done by applying a rotation transformation of a reference axis), whether the lighting beam falls inside or else outside the limits envisaged for operation.

Figure 4:
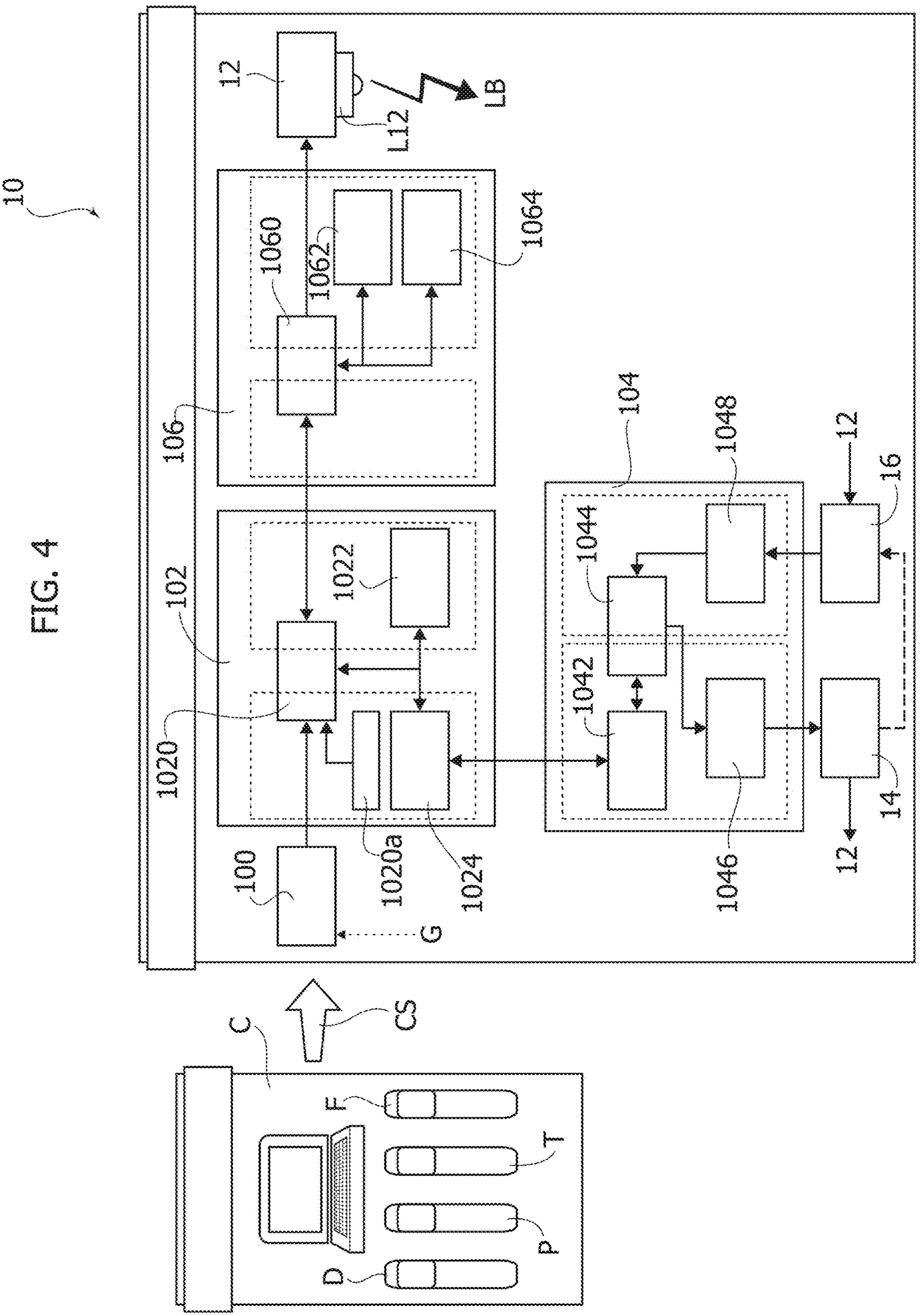
FIG. 4 is a block diagram exemplifying a system according to the embodiments.

FIG. 4 also exemplifies a possible structure of a lighting system that can use one or more lighting apparatuses 10 according to one or more embodiments.

In FIG. 4, denoted by C is a control unit (console) provided, according to criteria in themselves known to the persons skilled in the sector, with various commands (for example, cursor or slider commands), which allow an operator to control the level of light intensity (dimming command D), the pan value (pan command P), the tilting value (tilt command T) and other functions (function command F) of one or more lighting apparatuses 10 in a context of use of the type exemplified in FIGS. 1 to 3.

For simplicity, in what follows reference will be made to just one apparatus 10, it remaining understood that what is discussed hereinafter can apply to a number of apparatuses 10 that are the same as or different from one another. In one or more embodiments, these may be apparatuses 10 that use light-radiation generators of the type available from the present applicant Clay Paky under the brand name XTYLOS.

The console C can be implemented, for example, in the form of personal computer or similar device, as illustrated schematically in the representation on the right in FIG. 4.

Such a control unit is able to send to the apparatuses 10 corresponding control signals (for example, dimming signals, pan signals, tilt signals, colour signals, etc.), using a physical channel of any nature (wired or wireless). This can be obtained, for example, using a DMX (Digital MultipleX) protocol, a digital communication standard commonly used for controlling scene lighting and also in the civil-engineering field for architectural lighting.

As discussed in the introductory part of the present description, during propagation towards the sources 10, the above "primary" control signals emitted by the unit C may be corrupted following upon propagation over the channel CS and consequently be received at the apparatuses 10 with contents at least in part different from the expected ones, for example, as regards the pan and tilt commands.

This may moreover occur in conditions where the apparatus or apparatuses 10 could be activated according to undesired modalities (for example, in terms of intensity of the light beam and/or of apparent size of the source) also outside the bounds of the desired lighting zone or zones (denoted by LS1 in FIGS. 1 to 3).

In order to counter such undesired events, one or more embodiments may envisage that the control signals received at the source 10 (for example, via an input transceiver 100: this may be a transceiver that operates according to the DMX protocol even though, as has already been said, use of such a protocol is not imperative for the embodiments) are sent to a control (or monitoring) circuitry 102.

In one or more embodiments, the circuitry 102 may comprise a processing unit such as a microcontroller 1020, with associated thereto a memory 1020*a*, to which there may possibly be coupled a monitoring function of the watchdog type exemplified by block 1022.

The processing unit 1020 is able to co-operate, for example, through a bus transceiver 1024 with circuitry for driving the pan and tilt functions, which is designated as a whole by 104.

As exemplified in FIG. 4, to the driving circuitry 104 there can be coupled:

- a motorization 14 comprising one or more motors that are able to control the position of pan and/or tilt of the beam LB emitted by the light-radiation generator 12 (for example, a laser generator), to which there can be optionally coupled an optics L12, and detection circuitry (comprising, for example, a set of sensors) 16, which is able to detect the (effective) position of pan and/or tilt of the beam LB emitted by the generator 12, i.e., the direction in which the beam LB of light radiation emitted by the generator 12 is oriented.

Motorizations and sensor systems of this type are known to persons skilled in the sector since they are used, for example, in commercial products, such as the product XTYLOS repeatedly referred to previously; this renders it superfluous to provide a more detailed description herein.

For instance, the circuitry 104 may comprise a further transceiver 1042, which interacts with the transceiver 1024 in the circuitry 102 and has the capacity of co-operating with a controller 1044 (for example, implemented as FPGA (Field-Programmable Gate Array), which is in turn configured (also in this case in a way known to persons skilled in the sector) to co-operate with a drive assembly 1046 that controls the motorization 14 and with an interface 1048 towards the detection circuitry 16.

In this way, the controller 1044 is able to obtain (basically at a feedback level) signals indicative of the effective position (for example, in terms of pan and tilt) of the lighting beam LB generated by the generator 12.

The reference 106 in FIG. 4 designates driving circuitry of the generator 12, which can comprise, for example, a microcontroller 1060 configured to co-operate with the microcontroller 1020 and with the generator 12 to implement, possibly in cooperation with a hardware safety circuit 1062 and a watchdog function 1064, control functions of the generator 12.

Such functions may comprise, for example:

- turning-on (activation) and turning-off (deactivation) of the generator 12, and/or
- dimming of the light intensity emitted by the generator 12 as it is on or activated, and/or
- a variation of the apparent size (angular diameter, angular dimension, apparent diameter, or viewing angle, whatever term is used) of the generator 12: the latter function may be implemented, for example, by acting on the optics L12 associated to the generator 12.

A lighting apparatus 10—and, more in general, a lighting system as exemplified in FIG. 4—are suited to being used, for example, by a lighting designer, exploiting the possibility of identifying (for example, operating on the control unit C so as to move the beam LB of the generator 12 by acting according to criteria in themselves known on the pan and tilt controls P and T) the general boundaries of the space that may be illuminated by the lighting system (one or more apparatuses 10 governed by the unit C).

Added to the above is likewise the possibility of establishing, within the aforesaid space:

- one or more zones LS1 (desired lighting zones), in which the action of lighting can be carried out without any particular limitations or constraints, for example, with the intensity of the lighting beam LB of the generator 12 that can reach a desired (maximum) level;
- one or more zones LS2 (undesired lighting zones), in which the action of lighting is intended to be in some way contained or limited (restrained, constrained), for example, with the intensity of the lighting beam LB of the generator 12 reduced to e.g. 50% via a corresponding action of current modulation, or else with the apparent size of the generator 12 varied (by acting on the optics L12), or else again by deactivating the generator 12 altogether, or else by intervening on the motorization 14 in a way such that the lighting beam LB of the generator 12, albeit active at a full level or a reduced level, is not projected towards the zone or zones LS2.

One or more embodiments can in fact aim at taking into account the fact that, as discussed in the introductory part of the present description, the "primary" control signals emitted by the unit C may be altered or corrupted during propagation over the channel CS (which operates, for example, according to the DMX protocol) and be received at apparatus 10 (transceiver 100) as signals that are such as to lead the lighting beam LB of the generator 12 to being directed, perhaps with the generator 12 activated at the maximum level of emission, towards the undesired lighting zone or one of the undesired lighting zones LS2.

One or more embodiments may consequently envisage that, in such a situation, the apparatus 10 can, so to speak, "disobey" said altered or corrupted commands received and implement, for example, one or more of the measures seen previously (reduction of the intensity of the lighting beam, variation of the apparent size of the generator, complete deactivation of the generator, intervention of inhibition on the motorization) that aim at containing the action of the lighting zone or zones LS2 in order to prevent, for example, undesired projection of light radiation towards members of the audience A who are at a distance from the sources 10 less than the safety distance defined by HD.

Once again by way of non-limiting example, with reference for simplicity to just one apparatus 10 and to the presence of just one undesired lighting zone LS2, a possible strategy of use of an apparatus 10 as exemplified herein (and of the corresponding system) may envisage performing the actions presented in what follows:

- determining a first pan margin or bound P1 with an action of pan adjustment (command P in the unit C) as far as a desired position, with a corresponding fixed value that is then saved, for example, in the memory **1020*a*** by keeping the command F of the DMX channel depressed, for example, for five seconds;
- determining a second pan margin P2 with an action of pan adjustment (command P in the unit C) as far as a desired position, with a corresponding fixed value that is then saved, for example, in the memory **1020*a*** by keeping the command F of the DMX channel depressed, for example, for five seconds;
- identifying the undesired lighting zone LS2 as internal or external to the pan margins P1 and P2 identified above; this can be obtained, for example, as a function of a value higher or lower (for example, than a value of 50%) of a dimming level; this solution, which of course is not imperative, makes it possible to take into account the fact that the lighting designer, who operates from the light console or unit C may not have available a command (for example, a pushbutton) to choose whether the undesired lighting zone is internal or external and envisages that the choice be made on the basis of the dimming level; for example, if it is higher than 50% it is internal; if it is less than 50% it is external (or vice versa);
- determining a first tilt margin or bound T1 with an action of tilt adjustment (command T in the unit C) as far as a desired position, with a corresponding fixed value that is then saved, for example, in the memory **1020*a*** by keeping the command F of the DMX channel depressed, for example, for five seconds;
- determining a second margin T2 of tilt with an action of tilt adjustment (command T in the unit C) as far as a desired position, with a corresponding fixed value that is then saved, for example, in the memory 1020*a* by keeping the command F of the DMX channel depressed, for example, for five seconds;

identifying the undesired lighting zone LS2 as internal or external to the tilt margins T1 and T2 identified above, for example, as a function of a level higher or lower (for example, than a value of 50%) of a certain dimming level as described previously for the pan parameter;

possibly fixing, by default, pan limits (for example, with DMX values of 0 and 65535), in practice cancelling the definition of the zone LS2 in the pan direction, enabling activation of the generator 12 over the entire range of pan movement; and possibly fixing, by default, tilt limits (for example, with DMX values of 0 and 65535), in practice cancelling the definition of the zone LS2 in the tilt direction, enabling activation of the generator 12 over the entire range of tilt movement.

As has been said, the margins or bounds P1, P2, T1, T2 of the (allowed or desired lighting) zones LS1 and (undesired lighting) zones LS2, both for pan and for tilt can be saved in a memory 1020*a*, for example, a nonvolatile memory, which can be associated, for example, to the microcontroller 1020.

Added to the above is the possibility of envisaging functions such as:

overwriting new values of margins and amplitude of the zone LS2 (and hence of the zone LS1) with the same procedure as that used for writing them the first time;

varying one of the pan margins without affecting the other, with the possibility of redefining the range of operation allowed (i.e., inside or outside the margins), as described previously;

varying one of the pan margins without affecting the other, with the possibility of redefining the range of operation allowed (i.e., inside or outside the margins) as described previously;

extending in the pan direction the zone LS2 (and hence LS1) maintained without modifications as a function of the dimming value, in the presence of a change of pan margin that follows upon a previous change that has intervened after the last activation of the apparatus; and extending in the tilt direction the zone LS2 (and hence LS1), maintained without modifications as a function of the dimming value, in the presence of a change of tilt margin that follows upon a previous change that has intervened after the last activation of the apparatus.

It will again be noted that, in the case of movements of pan (slewing) of an extent greater than 360° (for example,) 540°), the zone LS2 can be identified by means of a modulo-360° operation, which in practice means that pan angles of between 360° and 540° can be considered as pan angles of between 0° and 180°.

Figure 5A:
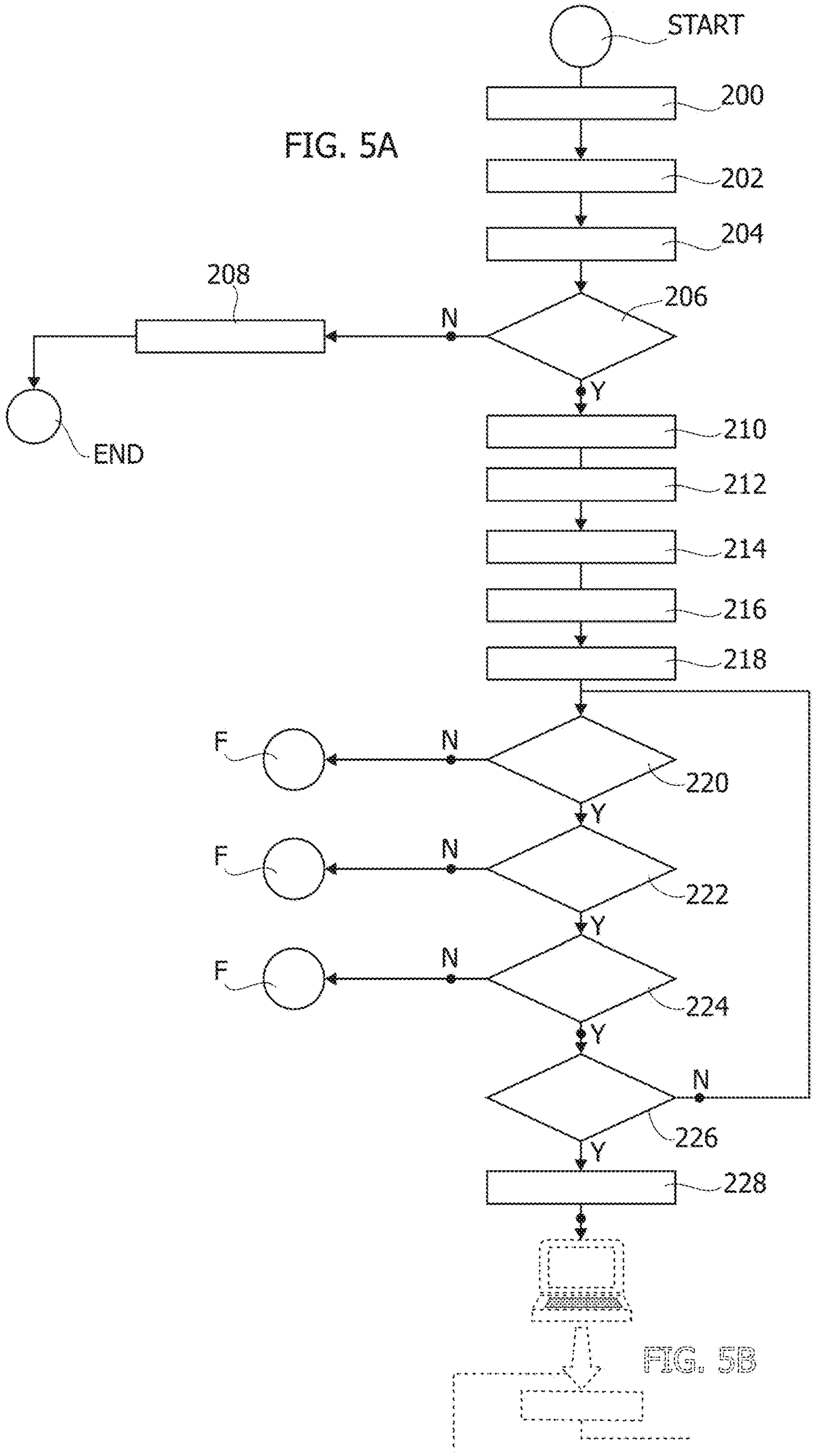
FIGS. 5A and 5B present as a whole a flowchart exemplifying possible modes of operation of some embodiments.
Figure 5B:
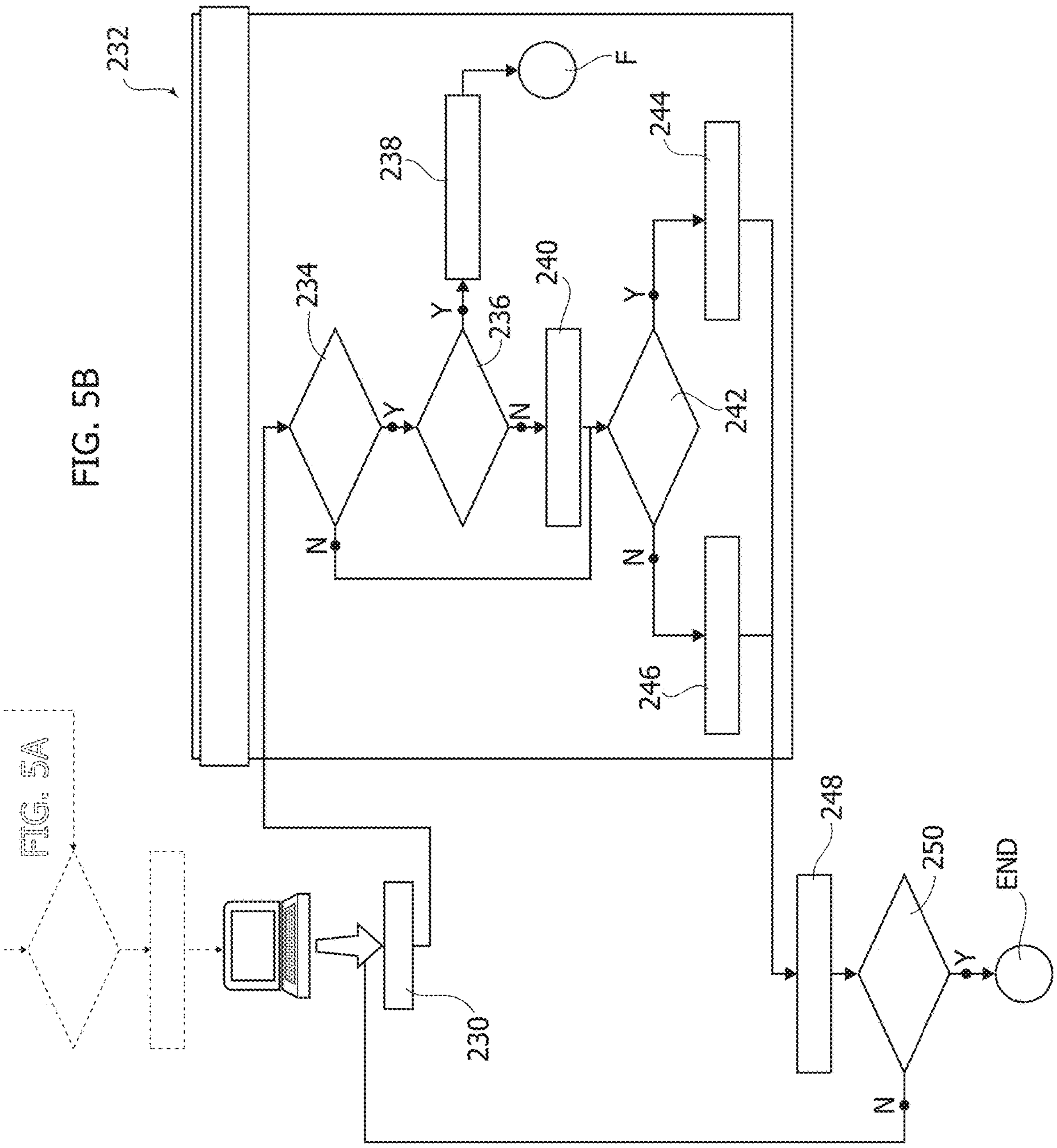

FIGS. 5A and 5B present a flowchart exemplifying a procedure inspired by the criteria outlined above.

The actions exemplified by the blocks of the flowchart of FIGS. 5A and 5B are the following:

START: start;

200: activation of the power supply;

202: turning-on of the apparatus 10;

204: booting of the CPU or CPUs of the apparatus;

206: check on proper booting with successful outcome from the low-level checks and retrieval of a valid firmware image in the memory;

208: negative outcome of booting, 206=N, with presentation of a backup image with a minimum set of functionalities in view of program end, END;

210: following upon a positive outcome in 206, 206=Y, implementation of a valid firmware image, optionally with the generator 12 kept deactivated;

212: homing of the movements such as pan and tilt;

214: possible homing of other movements in addition to pan and tilt (for example, yaw);

216: development of the above action of homing of pan/tilt and other possible movements with verification of various actions involved in given movements in view of the check on proper operation of the motorization 14 and of the sensor system 16;

218: completion of the homing procedure, assumed for simplicity as having been successful;

220, 222, 224: check on proper operation of the pan and tilt sensor system (16 in FIG. 4) with failure of the procedure, designated by F, in the presence of negative outcome of one of these checks, 220=N, 222=N, 224=N,

226: check on completion of the verification procedures of the previous actions with return upstream of block 220 in the presence of negative outcome, 226=N;

228: start of system run-time, for example, in the terms exemplified previously;

230: determination of (updated) positions of pan/tilt with activation of a routine 232 for management of the zones LS1, LS2.

In one or more embodiments, such a routine may comprise a complex of actions aimed at verifying proper operation of the motorization 14 such as:

234: verification of the possible loss of steps of movement;

236: in the presence loss of steps by the motorization, 234=Y, check on whether the number of steps lost exceeds a certain threshold value;

238: if it is found that the number of steps lost is higher than the above threshold 236=Y, forced turning-off of the generator 12 and declaration of failure F of the procedure; and

240: if it is found that the number of steps lost does not exceed a certain threshold value, 236=N, activation of a compensation procedure, with possible return to the check of block 234.

Following upon completion of the procedure of verification of proper operation of the motorization 14 (if envisaged), in a block 242 it is verified—also as a function of the position data obtained via the sensor system 16—whether the commands received by the apparatus 10 (for example, via the transceiver 100) are such as to bring the beam of the generator 12 outside the (desired) operating space LS1, i.e., towards an undesired lighting zone LS2.

A positive outcome from step 242 (242=Y) may correspond to indication of the fact that the beam of the generator 12 is bound to remain within the desired operating space LS1; in an action exemplified by block 244 there may consequently be authorized continuation of operation of the generator 12 in the conditions (for example, in terms of intensity of the light beam and of apparent dimensions) adopted previously.

A negative outcome of the check of step 242 (242=N), which indicates that the light beam of the generator 12 can be brought beyond the bounds of the space LS1, i.e., towards an undesired lighting zone LS2, can lead, as represented schematically by block 246, to implementation of measures (turning-off or dimming of the generator, reduction of the apparent size, blocking of the motorization 14, which can be carried out separately or in possible combination with one another, as discussed previously) that aim at containing undesired projection of the beam of the generator 12 outside the space LS1.

Block 248 exemplifies an action of displacement of the beam, via the motorization 14, towards a new position (if this movement has not been inhibited in the action 246), to which there can be associated, as exemplified by block 250, a check, starting from the signals provided by the sensor system 16, as to whether the desired position has been reached, with return upstream of the action 230 in the case of negative outcome (250=N) or else with end of the procedure (END) in the case of a positive outcome (250=Y).

Figure 6:
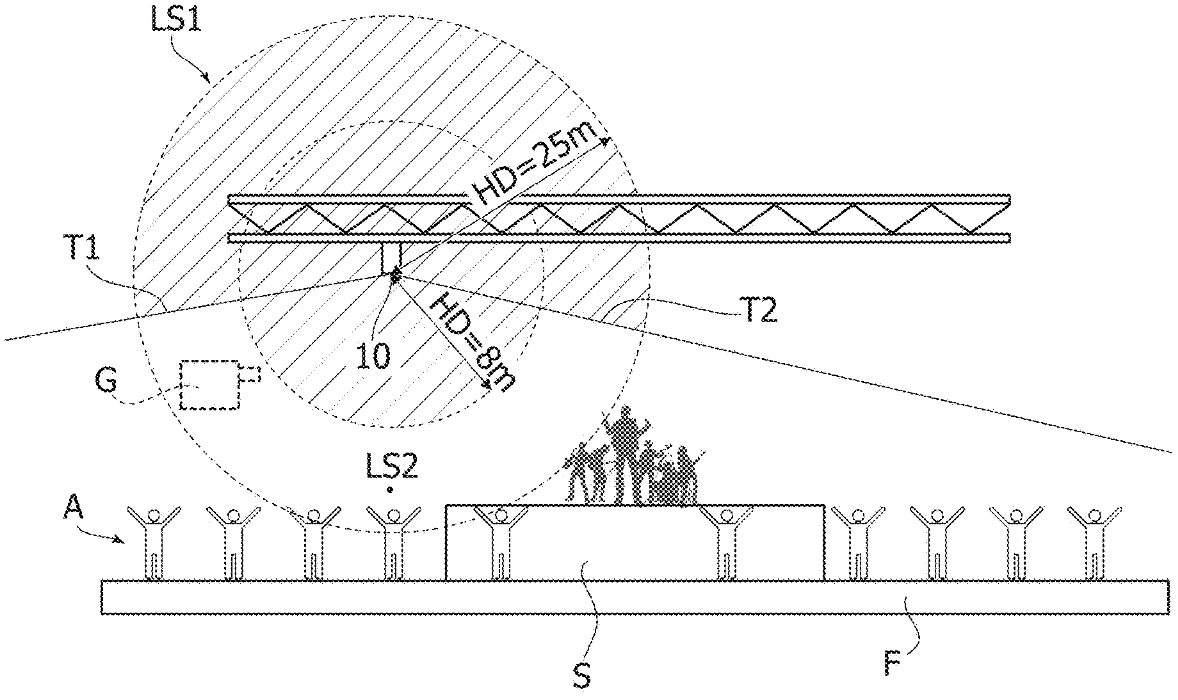
FIGS. 6 and 7 present, in a view in side elevation substantially resembling the view of FIG. 3, possible modes of use of some embodiments.
Figure 7:
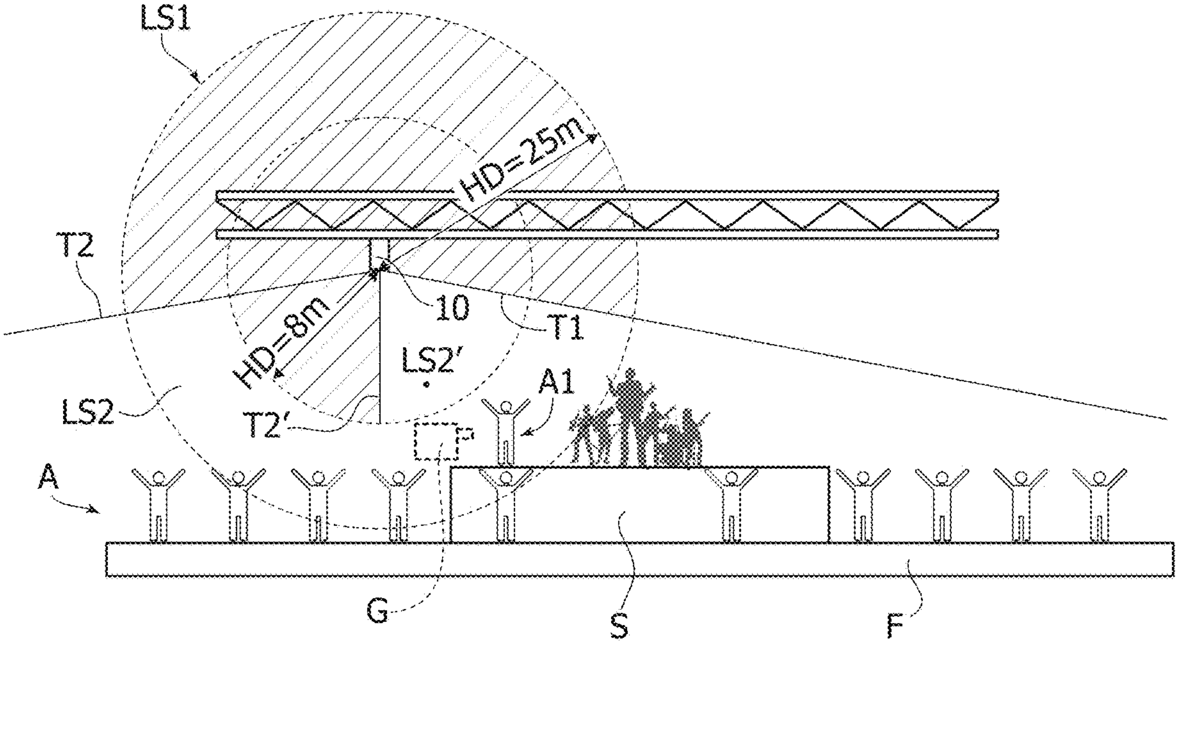

FIGS. 6 and 7 present possible modes of use of embodiments.

FIGS. 6 and 7 reproduce a view in side elevation substantially resembling the view of FIG. 3: for this reason, in FIGS. 6 and 7 parts or elements that are similar to parts or elements already described in relation to the previous figures are designated by the same references, and detailed description thereof is not repeated.

FIGS. 6 and 7 exemplify the possibility of implementing operating criteria as exemplified previously according to a smart operating mode as a possible addition to a standard and short-range operating mode, combining a complete range of aperture of the beam LB of a source 10 (1°-7°, for example) in standard mode, with the possibility of presenting a reduced hazard distance (HD) in short-range mode.

For this purpose, it is possible to exploit the possibility of reducing (in a way in itself known) the current for driving a generator such as the generator 12 of FIG. 4 (which uses, for example, three banks of laser diodes, of different colours, for example, according to an RGB scheme) in such a way that the hazard distance HD, which has a standard value of 25 m, is (always) less than 8 m, irrespective of the aperture of the beam LB.

In one or more embodiments, the aforesaid smart operating mode may be an alternative to the standard and short-range modes described previously.

In one or more embodiments, it is possible to envisage that the smart mode (as likewise the standard and short-range modes) can be selected only by acting, for example manually, on the apparatus 10 (for example, at the level of the unit 1020) and not via the console C.

In one or more embodiments, the smart mode enables enhancement of the standard and short-range modes with possible definition of one or more undesired lighting zones LS2, as discussed previously.

One or more embodiments can draw benefit from the possibility of measuring values of hazard distance HD for generators such as laser generators used in the product XTYLOS already referred to a number of times previously.

For instance (operating according to criteria in themselves known), it is possible to reduce the luminance of such generators by 15% of its value so as to allow beam-mode operation at 8 m, by reducing in an adequate way the driving currents of the laser diodes of the generator.

Of course, the aforesaid numeric values (for example, 25 m, 8 m, 15%, etc.) are provided purely by way of non-limiting example of the embodiments.

In this way, as exemplified in FIG. 6, it is possible, for example, to:

- operate as described previously (for example, with reference to FIGS. 5A and 5B) by enabling the beam LB at full power or standard intensity (e.g., HD=25 m) to be directed only towards the allowed lighting zone or zones, i.e., LS1, preventing it, instead, from being oriented towards the undesired lighting zone LS2 for tilt values comprised between T1 or T2,
- switch the generator (e.g., 12 in FIG. 4) to the short-range operating mode (e.g., HD=8 m) so as to prevent also in this case the beam LB from reaching the undesired lighting zone LS2 in the portion where there could be present subjects exposed to photobiological risk (this in a way independent of the limit tilt values T1 or T2).

In one or more embodiments, it is possible to envisage that, if no limit value of this nature is set, selection of the smart mode implies reduction of the driving currents so as to have a hazard distance HD with a maximum value of, for example, 8 m, taking into account the effects of the thermal drifts and of the corresponding tolerances, irrespective of the aperture of the beam (hence including the beam mode).

It is likewise possible to envisage that passage into high-power standard mode (e.g., HD=25 m), with the driving currents brought back to the nominal value, can be obtained only in "acceptable" areas (i.e., LS1) defined by the lighting designer only if the latter has intentionally established limits, for example, before a show.

Such a transition to HD=25 m can, for example, be implemented with a firmware architecture similar to the one described previously with reference to FIG. 4 and to FIGS. 5A and 5B (limits such as T1 and T2 stored in a nonvolatile way, for example, in a memory such as 1020*a*; automatic passage from 8 m to 25 m or vice versa once have the pan/tilt limits been exceeded; limits set before a show, which can be controlled on the basis of a checklist, and so forth).

Once again it is recalled that the numeric values mentioned here (for example, 25 m, 8 m, 15%, etc.) are provided purely by way of non-limiting example of the embodiments.

FIG. 7 exemplifies the possibility of envisaging situations, such as the one exemplified by a spectator, designated by A1, who can approach the source 10 in such a way that the photobiological risk may not be deemed ruled out either by preventing standard operation with HD=25 m in the range (lower range in FIG. 7) comprised between T1 and T2, or by switching operation to the short-range mode (HD=8 m).

In this case, it is possible to envisage a corresponding undesired lighting (sub)zone LS2', comprised between limits T1 and T2', with projection of the lighting beam of the light-radiation generator 12 towards this zone LS2' that is contained (for example, by envisaging deactivation of the generator 12 either with HD=25 m in standard mode or with HD=8 m in short-range mode) according to the modalities described previously.

In general (this consideration applies in practice to all the embodiments described or proposed herein), before the beam LB is oriented in a certain direction (pan/tilt value set by the lighting designer), the processing unit (microcontroller) 1020 of the apparatus 10 checks whether this direction is "acceptable", or else such as to require an intervention to modify the level of risk (for example, reduction of the intensity of the beam, if necessary with total turning-off or change of the apparent size of the source).

Such a sequential approach, i.e., i) control, ii) possible modification of the level of risk, iii) displacement of the beam in the direction set, facilitates prevention of the observer from being struck by an excessive light intensity.

As has been mentioned at the outset, it has been noted that aspects and considerations substantially similar to the ones discussed previously may be envisioned in relation to the use of light-sensitive devices of various nature, such as:

- camera apparatuses, such as photographic cameras, video cameras, television cameras, smartphones, tablets;

detectors or sensors in some way sensitive to light, such as presence sensors operating with visible light or non-visible light (for example, infrared) or else sensors that can be used for measuring distance and that can be equipped with moving heads.

It should moreover be considered that—in addition or as an alternative to the possible risk of a photobiological nature by the person who happens to be looking into a source of light radiation—there enters into play the risk that the light-sensitive device will be perturbed by the source of light radiation, for example, with corresponding risk of an undesired saturation (blooming), at least at a local level, of the image produced by a camera apparatus.

It should likewise be noted that camera apparatuses such as photographic cameras, television cameras, video cameras, smartphones, tablets, etc. are widely used in the show-business or entertainment sector: consider, purely by way of example, filming (with live and/or recorded transmission) of shows, such as concerts.

One or more embodiments may consequently envisage containing projection of the lighting beam of the light-radiation generator directed towards such a light-sensitive device (for example, by reducing the brightness of the source of light radiation or turning off the source of light radiation altogether) when there is the risk of the lighting beam illuminating directly the field of view (FOV) of the light-sensitive device with a specific direction in space when the lighting beam enters an undesired lighting zone (for example, the one defined previously LS2), i.e., a volumetric space that can be defined by the end user.

For instance (and as has already been seen) the above undesired lighting zone may correspond to a space in which projection of the lighting beam of the light-radiation generator is contained (for example, with the source turned off or reduced in brightness or inhibited from pointing the beam in the direction of the aforesaid volume) in such a way that the light beam cannot have a negative effect on the performance of the light-sensitive device when it is directed towards the latter: for example, by saturating the signal of a camera apparatus in the area of image illuminated by the light beam.

For instance, even if the effect of dazzling does not lead to saturation of the entire field of view of the camera apparatus, the fact of having an image that is otherwise well balanced but where, however, a part (even just a small part) is illuminated by the beam and hence affected by blooming may represent an undesired phenomenon that is to be avoided.

In one or more embodiments, such negative phenomena may be countered by envisaging operating according to the criteria already exemplified previously with reference to the risk of a photobiological nature from one or more members of the audience A envisaging that the (at least one) undesired lighting zone (e.g., LS2) can be defined also or exclusively as a function of the (effective or expected) position of one or more light-sensitive devices.

One of such apparatuses (for example, a television camera G) is schematically represented by a dashed line in FIGS. 1 to 3, 6 and 7.

In this regard, it will be noted that the situation hypothesized in FIG. 7 (a spectator A1 who may come very close to a lighting source 10) may occur frequently in the case of a camera apparatus, for example when the latter is carried by an operator or with a dolly or a crane in the proximity of an artist on the stage.

Once again, the fact that in FIGS. 1 to 3, 6 and 7 there is envisaged the presence of just one light-sensitive device G located among the audience A is motivated by considerations of simplicity of illustration and is provided purely by way of example.

One or more embodiments may in fact envisage the presence of a number of devices G, with the device or devices possibly located in a position different from the position of the audience.

In this regard, one or more embodiments may envisage, for example, use of one or more camera apparatuses in contexts where the presence of audience is not envisaged (for example, on film sets or in television studios).

One or more embodiments may contemplate operating according to the criteria already exemplified previously, envisaging that scanning of the lighting space LS1, LS2 is carried out with recognition (e.g., visual recognition) of the presence of a light-sensitive device (e.g., a television camera G).

In one or more embodiments, it may be envisaged that the light-sensitive device or devices G send their coordinates (obtained, for example, via locating system, such as GPS, UWB systems, or the like) to the control (monitoring) circuitry 102, as exemplified with a dashed line in FIG. 4.

For instance, one or more embodiments may, in substantial agreement with what has been discussed previously in relation to the reduction of the photobiological risk, contemplate that:

- an operator manually sets the limits (e.g., T1, T2, P1, and P2) for containing (e.g., attenuating) the beam, for example, before a show by operating on the basis of information regarding where the light-sensitive device or devices (e.g., the camera or cameras G) will be located;
- these limits are "loaded", for example, in the circuitry 102, starting from a show-design file in which information is recorded regarding where the light-sensitive device or devices (e.g., the camera or cameras G) will be located.

In one or more embodiments, for example, in the case of implementation of an automated function of the above sort, it is also possible to envisage, in the definition of the zone or zones LS2, safety margins with respect to the exact bounds of the space in which the light beam is directed towards the light-sensitive device or devices G.

As has already been seen in relation to the reduction of the photobiological risk, the action of containing the light beam in order to prevent perturbation of the light-sensitive device or devices (for example, dazzling of the camera or cameras G) may envisage, in addition or as an alternative to the reduction of the intensity or to turning-off of the source, interventions such as increase of the aperture of the beam, modulation of the flux of light at output (via pulse-width modulation, PWM, of the current) or variation of the wavelength of the light radiation (considering that the response of a camera apparatus may depend upon the wavelength).

As may be carried out also with reference to the risk of a photobiological nature, one or more embodiments may envisage definition of a total undesired lighting zone LS2 obtained by uniting or merging together a number of different (sub)zones LS2.

In one or more embodiments, it is possible to synchronize the lighting apparatus or apparatuses 10 with the light-sensitive device or devices (for example, the camera or cameras G) by activating the function of containment of the lighting beam or beams only in relation to the light-sensitive device or devices (for example, the camera or cameras G)

that are currently activated (and not, for example, in relation to the camera or cameras that are not currently being used for this purpose).

For instance, in one or more embodiments, the lighting manager or the lighting designer and/or the film director can select on which devices to activate the function during an entire show or during a part thereof.

In one or more embodiments, this result can be obtained in an automatic way, for example, via wired or wireless communication between the light-sensitive device or devices and the lighting apparatus or apparatuses 10, i.e., with a peer-to-peer or gateway approach.

A lighting apparatus as exemplified herein (e.g., 10) may comprise:

- a light-radiation generator (e.g., 12) configured to project a lighting beam (e.g., LB) towards a lighting space (e.g., LS1, LS2), the lighting space including at least one undesired lighting zone (e.g., LS2, defined by at least one pair of boundary values, such as P1, P2 or T1, T2, which may be defined as described herein and may be stored in the apparatus itself);
- a motorization (e.g., 14) of the light-radiation generator, configured to move the lighting beam of the light-radiation generator, so that the lighting beam of the light-radiation generator scans (i.e., is configured to scan) said lighting space, the motorization of the light-radiation generator being controllable (e.g., 102, 104) as a function of scanning-control signals received (e.g., 100) at the lighting apparatus;
- driving circuitry (e.g., 106) of the light-radiation generator configured to control emission of the lighting beam of the light-radiation generator;
- processing circuitry configured (for example, at the level of microcontrollers such as 1020, 1060) to sense the scanning-control signals received at the lighting apparatus (as has been seen, these signals may be received in a corrupted way as compared to how they have been sent) and the scanning position (e.g., 1024, 1042, 1044, 1048, 12) of the lighting beam of the light-radiation generator, the processing circuitry being configured to act, as a result of detection of scanning-control signals received at the lighting apparatus leading (that is, are such as to lead, namely that in themselves would lead) the lighting beam of the light-radiation generator to being brought (i.e., projected) in said at least one undesired lighting zone, on the motorization (by controlling movement thereof) and/or on the driving circuitry of the light-radiation generator for containing projection of the lighting beam of the light-radiation generator directed towards said at least one undesired lighting zone of said lighting space.

As has been seen, the aforesaid movement of orientation (steering) of the light beam in the three-dimensional space is commonly referred to as scanning also in the corresponding international safety standard.

In a lighting apparatus as exemplified herein, said processing circuitry can be configured to:

- sense said scanning-control signals received at the lighting apparatus, said scanning-control signals comprising signals indicative of the position of at least one light-sensitive device (for example, a television camera G or another light-sensitive device, operation of which can be perturbed by the light of the source or sources 10) in said lighting space; and
- act, as a result of detection of said signals indicative of the position of at least one light-sensitive device in said lighting space, on the motorization (by controlling movement thereof) and/or on the driving circuitry of the light-radiation generator for containing projection of the lighting beam of the light-radiation generator directed towards said at least one light-sensitive device.

As has been seen, the above signals indicative of the position of at least one light-sensitive device (for example, a television camera G) in said lighting space may be provided:

- by the light-sensitive device itself, which is able to obtain the corresponding data via locating systems such as GPS, UWB systems, or the like;
- by an operator who manually sets the limits for containment of the beam on the basis of information regarding where the light-sensitive device or devices (e.g., the camera or cameras G) will be located; or
- as limits "loaded" starting from a show-design file, in which information is recorded regarding where the light-sensitive device or devices will be located.

As exemplified herein, the action of containing projection of the lighting beam of the light-radiation generator directed towards the undesired lighting zone can be performed in various ways, for example:

- operating so as to prevent the lighting beam of the light-radiation generator from being directed, i.e., projected, towards the undesired lighting zone; and
- operating in such a way that the lighting beam of the light-radiation generator, albeit directed, i.e., projected, towards the undesired lighting zone, is projected there in conditions (for example, with reduced intensity) such as to prevent the photobiological risk.

For instance, in a lighting apparatus as exemplified herein, said processing circuitry may be configured to contain projection of the lighting beam of the light-radiation generator directed towards said at least one undesired lighting zone of said lighting space by reducing the intensity of the lighting beam of the light-radiation generator.

In a lighting apparatus as exemplified herein, said processing circuitry may be configured to reduce the intensity of the lighting beam of the light-radiation generator via at least one of the following:

- deactivation of the light-radiation generator;
- dimming, for example, with current modulation, applied to the lighting beam of the light-radiation generator (so as to pass, for example, from HD=25 m to HD=8 m);
- variation of the emission spectrum of the light-radiation generator;
- variation of the apparent size of the light-radiation generator; and
- variation of the diameter and/or intensity profile of the lighting beam of the light-radiation generator.

In a lighting apparatus as exemplified herein, said processing circuitry may be configured to contain projection of the lighting beam of the light-radiation generator directed towards at least one portion of said at least one undesired lighting zone (see, for example, the portion LS2' in FIG. 7) by i) reducing the intensity of the lighting beam of the light-radiation generator (so as to pass, for example, from HD=25 m to HD=8 m) and, possibly, ii) deactivating the light-radiation generator with reduced beam intensity in an area corresponding to said at least one portion (e.g., LS2') of said at least one undesired lighting zone.

In a lighting apparatus as exemplified herein, said processing circuitry may be configured to contain projection of the lighting beam directed towards said at least one undesired lighting zone of said lighting space by countering (for example, inhibiting the motorization 14) movement of the lighting beam of the light-radiation generator that leads the lighting beam of the light-radiation generator to scan said at least one undesired lighting zone of said lighting space.

In a lighting apparatus as exemplified herein, the motorization of the light-radiation generator may be configured to vary at least one between pan (e.g., P1, P2) and tilt (e.g., T1, T2) of the lighting beam of the light-radiation generator as a function of scanning-control signals received (e.g., 100) at the lighting apparatus.

A lighting apparatus as exemplified herein may comprise memory circuitry (e.g., 1020*a*) configured to store therein at least one pair of boundary values (e.g., P1, P2; T1, T2) of said at least one undesired lighting zone of said lighting space.

In a lighting apparatus as exemplified herein, the motorization and the driving circuitry of the light-radiation generator, as well as said processing circuitry, may be integrated in a single device with the light-radiation generator.

A lighting system (e.g., C, 10) as exemplified herein may comprise:

at least one lighting apparatus;

lighting-control circuitry (e.g., C) configured to send over a transmission channel (e.g., CS) to said at least one lighting apparatus primary scanning-control signals, wherein the scanning-control signals received at the lighting apparatus result from propagation of said primary scanning-control signals over said transmission channel (with possible corruption following upon said propagation).

A lighting system as exemplified herein may comprise at least one light-sensitive device (e.g., G) in said lighting space, said at least one light-sensitive device being configured to send to said processing circuitry signals indicative of the position of said at least one light-sensitive device in said lighting space, and said processing circuitry may be configured to:

sense said signals indicative of the position of at least one light-sensitive device in said lighting space; and control, as a result of the detection of said signals indicative of the position of at least one light-sensitive device in said lighting space, the movement of the motorization and/or the driving circuitry of the light-radiation generator to contain projection of the lighting beam of the light-radiation generator directed towards said at least one light-sensitive device.

A method of operation of a lighting apparatus as exemplified herein may comprise activating said processing circuitry for sensing scanning-control signals received at the lighting apparatus and the scanning position of the lighting beam of the light-radiation generator, whereby, as a result of detection of scanning-control signals received at the lighting apparatus leading (that is, are such as to lead, namely that in themselves would lead) the lighting beam of the light-radiation generator to being brought into said at least one undesired lighting zone, said processing circuitry can act on the motorization (by controlling movement thereof) and/or one the driving circuitry of the light-radiation generator and contain projection of the lighting beam of the light-radiation generator directed towards said at least one undesired lighting zone of said lighting space.

A method as exemplified herein may comprise, prior to sensing scanning-control signals received at the lighting apparatus and the scanning position of the lighting beam of the light-radiation generator, reading at least one pair of boundary values (e.g., P1, P2; T1, T2) of said at least one undesired lighting zone of said lighting space stored in the lighting apparatus (e.g., 10).

A method as exemplified herein may comprise defining said at least one undesired lighting zone of said lighting space as a function of said at least one pair of boundary values, as:

a portion of said lighting space lying between said boundary values (e.g., P1, P2; T1, T2) of said at least one pair of boundary values (e.g., P1, P2; T1, T2); or a portion of said lighting space lying outside said boundary values of said at least one pair of boundary values.

A computer program product that can be loaded into a memory of the processing circuitry of a lighting apparatus as exemplified herein may comprise portions of software code to implement the method as exemplified herein.

The above product may, for example, be a computer program product that can be loaded into a memory of the processing circuitry of a lighting apparatus as exemplified herein, the computer program product comprising instructions that, when the product is executed by said processing circuitry, cause said processing circuitry to implement the steps of the method as exemplified herein.

Without prejudice to the underlying principles, the details of construction and the embodiments may vary, even significantly, with respect to what has been illustrated herein purely by way of non-limiting example, without thereby departing from the scope of protection.

For instance, just to mention—without this implying any limitation—some possible advantageous developments of one or more embodiments:

the definition of the allowed or desired lighting zone or zones LS1 (beam-allowed zones) and of the undesired lighting zone or zones LS2 may be obtained, possibly in a dynamic way, on the basis of detections of the environment (e.g., of the stage S) of a visual nature, for example, on the basis of images or on the basis of a scan (e.g., performed via a LIDAR system) with possible conversion (e.g., via an image-recognition software) into a morphological map of the environment;

in addition or as an alternative to dimming or turning-off, the action of containing projection of the lighting beam LB of the light-radiation generator 12 directed towards the undesired lighting zone or zones LS2 may entail varying the spectral combination (colour) of the light radiation of the beam LB, for example, moving from the blue region to the red region, taking into account the fact that radiation with different wavelengths may entail different levels of photobiological risk in so far as, for example, a red radiation can contain less energy than a blue radiation;

turning-off of the generator 12 upon transition between an allowed or desired lighting zone LS1 and an undesired lighting zone LS2 can be obtained via gradual dimming;

in the presence of two or more apparatuses 10, it is possible to carry out the checks (which are possibly pre-programmed) described previously in relation to their combined emissions;

to reduce the intensity of the lighting beam of the light-radiation generator 12 it is possible to vary (e.g., by acting via an optical element, such as the aperture of a diaphragm) the diameter or the intensity profile of the beam 12;

to take into account possible response times of internal sensors of the apparatus 10 (see, for example, the sensors 16 in FIG. 4) the system can "anticipate" the conditions of adjustment that define the value of HD provided that the latter is available at the moment of a possible transition through the above value;

it is possible to envisage various modalities to verify input (storage) of adequate safety settings.

As regards the latter aspect, it is possible to envisage (e.g., in the processing circuitry designed to act on the driving circuitry of the light-radiation generator) a function that can be activated during testing of the apparatus configured to control emission of the lighting beam of the light-radiation generator (e.g., in conditions of low current, hence with reduced intensity of emission) by modifying the spectrum, i.e., the colour of the light beam emitted, for example, in such a way that:

in conditions (e.g., of pan and/or tilt) where the beam would be led to being brought into said at least one undesired lighting zone (where it is intended to contain projection of the lighting beam), during testing there is an emission (e.g., at low intensity) of a first colour (e.g., blue), in conditions (e.g., of pan and/or tilt) corresponding to projection of the beam towards a desired lighting zone, during the test there is an emission (e.g., also here at low intensity) of (at least) one second colour (e.g., green or red).

In this way, the operator (e.g., the lighting designer) is able to verify visually correct definition of the parameters that identify the undesired lighting zone or zones and the desired lighting zone or zones.

These criteria can be applied also in embodiments as exemplified in FIGS. 6 and 7, envisaging, for example, use of a certain colour (e.g., green) for the zone or zones where HD=8 m and another colour (e.g., red) for the zone or zones where HD=25 m, with possible application both in standard operating mode and in short-range mode, as described previously.

Of course, the indications provided herein as regards possible colours, or else (as has already been said) particular numeric values of distance (also as regards the number of the possible values of distance considered) are provided purely by way of example. Just to provide another (once again non-limiting) example, in one or more embodiments it is possible to choose 21.5 m=orange, 18.5=yellow, 15 m=light green.

Whatever the specific modalities of implementation, during safety testing it is possible, for example, to intervene, even manually, on the light-radiation generator so as to vary the colour (spectrum) of the radiation emitted, which changes with the position of orientation.

The operator is hence able to carry out the test on specific positions, and, if so required, demonstrate to a person responsible for checking safety (for example, an external inspector) that the apparatus is set in a correct way so as to contain projection of the lighting beam of the light-radiation generator directed towards the undesired lighting zone or zones.

One or more embodiments are hence suited to implementation of a testing phase in which said driving circuitry (e.g., 106) can activate the light-radiation generator as a function of said at least one pair of boundary values (e.g., P1, P2; T1, T2):

with a first emission spectrum in said at least one undesired lighting zone; and with at least one second emission spectrum, different from said first emission spectrum, outside said at least one undesired lighting zone.

In one or more embodiments, in said testing phase, said driving circuitry can activate the light-radiation generator with the reduced intensity of emission.

The test can hence be conducted in conditions of low current, thus with reduced intensity of emission.

This makes it possible to carry out the test in conditions of high safety with a short safety distance (virtually zero) in so far as what is important for the purposes of the test is the differentiation between the emission spectrum of the light-radiation generator towards the undesired lighting zone or zones and the emission spectrum thereof outside the aforesaid zone or zones.

For instance, supposing having to do with an RGB light-radiation generator that can be activated at full power with HD value equal, for example, to approximately 25 m or approximately 18 m, for full blue or full red, it is possible to conduct the test with a power of emission lower than 10% of the maximum value, with a safety distance of, for example, 3 m (for blue).

Once again, the indications given herein as regards possible colours or else particular numeric values of distance are provided purely by way of example.

LIST OF REFERENCE SIGNS

Scene or stage S
Ground or floor F
Audience A
Light-sensitive device G
Lighting space LS1, LS2, LS2'
Desired lighting zone LS1
Undesired lighting zone LS2, LS2'
Pan values P1, P2
Tilt values T1, T2
Lighting apparatus 10
Light-radiation generator 12
Generator optics L12
Lighting beam LB
Beam motor-drive 14
Sensor system 16
Control unit (console) C
Dimming command D
Pan command P
Tilt command T
Function command F
Control-signal transmission channel CS
Input transceiver 100
Control (and monitoring) circuitry 102
Processing unit (microcontroller) 1020
Memory 1020*a*
Watchdog 1022
Transceiver 1024
Pan and tilt driving circuitry 104
Transceiver 1042
Controller 1044
Drive assembly 1046
Interface 1048
Generator-driving circuitry 106
Microcontroller 1060
Hardware safety circuit 1062
Watchdog 1064
Start START
Activation of power supply 200
Turning-on of apparatus 202
Booting of CPU 204
Check on correct booting 206
Presentation of backup image 208
End END
Execution of valid firmware image 210
Homing of pan and tilt 212

Homing of other movements 214
Development of homing action 216
Completion of homing procedure 218
Checks on functions 220, 222, 224
Procedure failure F
Check on completion of checks 226
Start of run-time 228
Determination of new pan/tilt positions 230
Management routine of zones LS1, LS2 232
Check on loss of movement steps 234
Check on number of steps lost above threshold 236
Forced turning-off of generator 238
Compensation procedure 240
Check on commands received 242
Continuation of operation of generator 244
Measures for containing projection of undesired beam 246
Beam displacement 248
Check on whether desired position is reached 250

The invention claimed is:

1. A lighting apparatus, comprising:

a light-radiation generator configured to project a lighting beam towards a lighting space, the lighting space including at least one undesired lighting zone;

a motorization of the light-radiation generator configured to move the light-radiation generator to move the lighting beam of the light-radiation generator, whereby the lighting beam of the light-radiation generator is configured to scan said lighting space, the motorization of the light-radiation generator being controllable to control the position of pan and/or tilt of the lighting beam of the light-radiation generator as a function of scanning-control signals received at the lighting apparatus, wherein the motorization of the light-radiation generator is coupled to motorization driving circuitry;

driving circuitry of the light-radiation generator configured to control emission of the lighting beam of the light-radiation generator;

a sensor system coupled to the motorization driving circuitry configured to detect the effective pan and/or tilt of the lighting beam of the light-radiation generator;

processing circuitry configured to detect the scanning-control signals received at the lighting apparatus and a scanning position of the lighting beam of the light-radiation generator, the processing circuitry being configured to control, also as a function of the position data obtained via said sensor system and as a result of the detection of scanning-control signals received at the lighting apparatus leading the lighting beam of the light-radiation generator to being brought into said at least one undesired lighting zone, the movement of the motorization and/or the driving circuitry of the light-radiation generator to contain projection of the lighting beam of the light-radiation generator directed towards said at least one undesired lighting zone of said lighting space; and memory circuitry configured to store therein at least one pair of boundary values of said at least one undesired lighting zone of said lighting space.

2. The lighting apparatus according to claim 1, wherein said processing circuitry is configured to:

detect said scanning-control signals received at the lighting apparatus, said scanning-control signals comprising signals indicative of the position of at least one light-sensitive device in said lighting space; and control, as a result of the detection of said signals indicative of the position of at least one light-sensitive device in said lighting space, the movement of the motorization and/or the driving circuitry of the light-radiation generator to contain projection of the lighting beam of the light-radiation generator directed towards said at least one light-sensitive device.

3. The lighting apparatus according to claim 1, wherein said processing circuitry is configured to contain projection of the lighting beam of the light-radiation generator directed towards said at least one undesired lighting zone of said lighting space by reducing the intensity of the lighting beam of the light-radiation generator.

4. The lighting apparatus according to claim 3, wherein said processing circuitry is configured to reduce the intensity of the lighting beam of the light-radiation generator via at least one of:

deactivation of the light-radiation generator;

dimming applied to the lighting beam of the light-radiation generator;

variation of the emission spectrum of the light-radiation generator;

variation of the apparent size of the light-radiation generator; and variation of the diameter and/or of the intensity profile of the lighting beam of the light-radiation generator.

5. The lighting apparatus according to claim 3, wherein said processing circuitry is configured to contain projection of the lighting beam of the light-radiation generator directed towards at least one portion of said at least one undesired lighting zone by reducing the intensity of the lighting beam of the light-radiation generator and deactivating the light-radiation generator with reduced beam intensity at said at least one portion of said at least one undesired lighting zone.

6. The lighting apparatus according to claim 1, wherein said processing circuitry is configured to contain projection of the lighting beam directed towards said at least one undesired lighting zone of said lighting space by countering movement of the lighting beam of the light-radiation generator leading the lighting beam of the light-radiation generator to scan said at least one undesired lighting zone of said lighting space.

7. The lighting apparatus according to claim 1, wherein the motorization of the light-radiation generator is configured to vary at least one of the pan and the tilt of the lighting beam of the light-radiation generator as a function of scanning-control signals received at the lighting apparatus.

8. The lighting apparatus according to claim 1, wherein the motorization and the driving circuitry of the light-radiation generator as well as said processing circuitry, are integrated in a single device with the light-radiation generator.

9. A lighting system, comprising:

at least one lighting apparatus according to claim 1, and lighting-control circuitry configured to send primary scanning-control signals over a transmission channel to said at least one lighting apparatus, wherein the scanning-control signals received at the lighting apparatus result from the propagation of said primary scanning-control signals over said transmission channel.

10. The lighting system according to claim 9, further comprising at least one light-sensitive device in said lighting space, said at least one light-sensitive device being configured to send to said processing circuitry signals indicative of the position of said at least one light-sensitive device in said lighting space, wherein said processing circuitry is configured to:

detect said signals indicative of the position of at least one light-sensitive device in said lighting space; and control, as a result of the detection of said signals indicative of the position of at least one light-sensitive device in said lighting space, the movement of the motorization and/or the driving circuitry of the light-radiation generator to contain projection of the lighting beam of the light-radiation generator directed towards said at least one light-sensitive device.

11. A method for operating a lighting apparatus according to claim 1, the method comprising:

activating said processing circuitry for detecting scanning-control signals received at the lighting apparatus and the scanning position of the lighting beam of the light-radiation generator, whereby, as a result of detection of scanning-control signals received at the lighting apparatus leading the lighting beam of the light-radiation generator to being brought into said at least one undesired lighting zone, said processing circuitry controls the movement of the motorization and/or the driving circuitry of the light-radiation generator and contains projection of the lighting beam of the light-radiation generator directed towards said at least one undesired lighting zone of said lighting space.

12. The method according to claim 11, further comprising, prior to detecting scanning-control signals received at the lighting apparatus and the scanning position of the lighting beam of the light-radiation generator, reading at least one pair of boundary values of said at least one undesired lighting zone of said lighting space stored in the lighting apparatus.

13. The method according to claim 12, comprising defining said at least one undesired lighting zone of said lighting space as a function of said at least one pair of boundary values as either:

a portion of said lighting space lying between said boundary values of said at least one pair of boundary values, or a portion of said lighting space that lies outside said boundary values of said at least one pair of boundary values.

14. The method according to claim 11, comprising a testing phase wherein said driving circuitry activates the light-radiation generator as a function of said at least one pair of boundary values:

with a first emission spectrum in said at least one undesired lighting zone; and with at least one second emission spectrum, different from said first emission spectrum, outside said at least one undesired lighting zone.

15. The method according to claim 14, wherein, in said testing phase, said driving circuitry activates the light-radiation generator with reduced intensity of emission.

16. The lighting apparatus of claim 1, wherein the processing circuitry further comprising a non-transitory computer readable medium comprising instructions which, when executed by a one or more processors, cause the processing circuitry to activate the processing circuitry for detecting scanning-control signals received at a lighting apparatus and a scanning position of the lighting beam of the light-radiation generator, whereby, as a result of detection of scanning-control signals received at the lighting apparatus leading the lighting beam of the light-radiation generator to being brought into said at least one undesired lighting zone, said processing circuitry controls the movement of the motorization and/or the driving circuitry of the light-radiation generator and contains projection of the lighting beam of the light-radiation generator directed towards said at least one undesired lighting zone of said lighting space.

* * * * *